(12) United States Patent
Corrie et al.

(10) Patent No.: US 11,809,751 B2
(45) Date of Patent: *Nov. 7, 2023

(54) IMAGE FILE OPTIMIZATIONS BY OPPORTUNISTIC SHARING

(71) Applicant: VMware, Inc., Palo Alto, CA (US)

(72) Inventors: Benjamin J. Corrie, Woodinville, WA (US); Harsh Kumar, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/678,945

(22) Filed: Feb. 23, 2022

(65) Prior Publication Data

US 2022/0179592 A1 Jun. 9, 2022

Related U.S. Application Data

(63) Continuation of application No. 16/752,305, filed on Jan. 24, 2020, now Pat. No. 11,262,953.

(51) Int. Cl.
  *G06F 9/455* (2018.01)
  *G06F 3/06* (2006.01)

(52) U.S. Cl.
  CPC .......... *G06F 3/0665* (2013.01); *G06F 3/0604* (2013.01); *G06F 3/067* (2013.01); *G06F 3/0644* (2013.01); *G06F 3/0683* (2013.01); *G06F 9/45558* (2013.01); *G06F 2009/45562* (2013.01); *G06F 2009/45583* (2013.01); *G06F 2009/45595* (2013.01)

(58) Field of Classification Search
  CPC ............................................. G06F 2009/45583

USPC ............................................................ 718/1
See application file for complete search history.

(56) References Cited

U.S. PATENT DOCUMENTS

| | | | |
|---|---|---|---|
| 8,966,318 B1* | 2/2015 | Shah ................... | G06F 11/3664 714/28 |
| 9,891,952 B1* | 2/2018 | Chen ........................ | G06F 9/50 |
| 10,430,378 B1* | 10/2019 | Harter .................... | G06F 16/16 |
| 10,684,884 B1* | 6/2020 | Emelyanov ......... | G06F 9/45558 |

(Continued)

OTHER PUBLICATIONS

Ernst, E. et al. "Kata Containers Architecture," GitHub, Inc., 2019, 22 pages, URL: https://github.com/kata-containers/documentation/blob/master/design/architecture.md.

(Continued)

*Primary Examiner* — Mehran Kamran
(74) *Attorney, Agent, or Firm* — Kim & Stewart LLP

(57) ABSTRACT

Container images are fetched in a clustered container host system with a shared storage device. Fetching a first container image in a first virtual machine includes creating a first virtual disk in the shared storage device, storing an image of the first container in the first virtual disk, mounting the first virtual disk to the first virtual machine, and updating a metadata cache to associate the image of the first container to the first virtual disk. Fetching a second container image in a second virtual machine includes checking the metadata cache to determine that a portion of the image of the second container is stored in the first virtual disk, creating a second virtual disk in the shared storage device, adding a reference to the first virtual disk in a metadata of the second virtual disk, and mounting the second virtual disk to the second virtual machine.

15 Claims, 14 Drawing Sheets

(56) References Cited

U.S. PATENT DOCUMENTS

| | | | |
|---|---|---|---|
| 10,698,925 B1 | 6/2020 | Zhao et al. | |
| 10,990,365 B2* | 4/2021 | Burgazzoli | G06F 16/51 |
| 11,093,221 B1* | 8/2021 | Novy | G06F 8/63 |
| 11,262,953 B2* | 3/2022 | Corrie | G06F 8/63 |
| 2012/0109958 A1* | 5/2012 | Thakur | G06F 16/122 |
| | | | 707/E17.089 |
| 2014/0053150 A1* | 2/2014 | Barnett | G06F 9/45558 |
| | | | 718/1 |
| 2016/0004480 A1* | 1/2016 | Lakshman | G06F 3/0661 |
| | | | 711/114 |
| 2016/0004611 A1* | 1/2016 | Lakshman | G06F 11/20 |
| | | | 714/6.23 |
| 2016/0098285 A1* | 4/2016 | Davis | G06F 9/45545 |
| | | | 718/1 |
| 2016/0314447 A1* | 10/2016 | Trevathan | G06Q 30/0609 |
| 2017/0083541 A1* | 3/2017 | Mann | G06F 16/119 |
| 2017/0132090 A1* | 5/2017 | Banerjee | G06F 9/44505 |
| 2017/0264684 A1 | 9/2017 | Spillane et al. | |
| 2017/0371693 A1* | 12/2017 | Corrie | G06F 16/188 |
| 2018/0054469 A1* | 2/2018 | Simoncelli | H04L 67/1097 |
| 2018/0203736 A1* | 7/2018 | Vyas | G06F 9/5077 |
| 2018/0307537 A1* | 10/2018 | Chen | G06F 16/128 |
| 2018/0336079 A1* | 11/2018 | Soman | G06F 9/548 |
| 2018/0365006 A1* | 12/2018 | Carvalho | G06F 8/61 |
| 2018/0365238 A1* | 12/2018 | Eder | G06F 16/13 |
| 2019/0243681 A1* | 8/2019 | Chen | G06F 16/24573 |
| 2019/0294461 A1* | 9/2019 | Woods | G06F 16/14 |
| 2019/0354389 A1* | 11/2019 | Du | G06F 9/45545 |
| 2019/0392050 A1* | 12/2019 | Weil | G06F 16/176 |
| 2020/0092392 A1 | 3/2020 | Seelam et al. | |
| 2020/0104385 A1* | 4/2020 | Zheng | G06F 9/45558 |
| 2020/0133883 A1 | 4/2020 | Bedi et al. | |
| 2020/0136825 A1* | 4/2020 | Gupta | H04L 41/0895 |
| 2020/0142865 A1* | 5/2020 | Manjunath | G06F 16/188 |
| 2020/0272440 A1* | 8/2020 | Burgazzoli | G06F 8/70 |
| 2020/0301791 A1 | 9/2020 | Zhang et al. | |
| 2020/0409921 A1* | 12/2020 | Starks | G06F 9/54 |
| 2021/0004292 A1* | 1/2021 | Zlotnick | G06F 9/4416 |
| 2021/0004712 A1* | 1/2021 | Sarferaz | H04L 41/16 |
| 2021/0042141 A1* | 2/2021 | De Marco | G06F 8/656 |
| 2021/0092071 A1* | 3/2021 | Tortosa | H04L 67/52 |
| 2021/0096894 A1 | 4/2021 | Rupprecht et al. | |
| 2021/0232344 A1 | 7/2021 | Corrie | |
| 2021/0232345 A1 | 7/2021 | Corrie et al. | |
| 2021/0232418 A1* | 7/2021 | Corrie | G06F 8/61 |
| 2022/0179592 A1* | 6/2022 | Corrie | G06F 3/0683 |

OTHER PUBLICATIONS

Vmware, Inc. "Overview of vSphere Integrated Containers," Product version: 1.5, 2019, 21 pages.

Notice of Allowance dated Jan. 5, 2023 in U.S. Appl. No. 16/751,505, 14 pages.

Examiner search result for "running docker on VM", performed May 28, 2022 (Year: 2022), 3 pages.

Examiner search result for "Mounting a virtual disk path is mounting a drive", performed on May 28, 2022 (Year: 2022), 2 pages.

Non-Final Office Action dated Jun. 8, 2022 in U.S. Appl. No. 16/751,505, 36 pages.

* cited by examiner

IMAGE FILE OPTIMIZATIONS BY OPPORTUNISTIC SHARING

CROSS-REFERENCE

This application is a continuation of U.S. patent application Ser. No. 16/752,305, filed Jan. 24, 2020, which is incorporated by reference herein.

BACKGROUND

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts It offers flexibility in application development and offers several useful tools for scaling.

In a Kubernetes system, containers are grouped into a logical unit called a "pod." Containers in the same pod share the same resources and network, and maintain a degree of isolation from containers in other pods. The pods are distributed across nodes of the Kubernetes system and an image cache is provided on each node to speed up pod deployment. However, when an instance of the same pod is deployed across multiple nodes, and none of the image caches of the nodes have the images of containers that are in the pod, the network can become saturated during the deployment.

In addition, the image caches in a Kubernetes system are opaque to the user. Without a view into which images are cached on which nodes, it is not possible to know how quickly pods can be deployed on a node. Thus, the deployment time for a pod becomes non-deterministic because some nodes may have the images cached and some nodes may not. As a result, it can be difficult to make appropriate scheduling decisions.

Over time, duplication of cached images across nodes may also result. Because the image binaries are generally not small, the amount of disk space consumed by them can become very large, e.g., N× their size when they are cached on N nodes. Accordingly, pre-seeding of the images in the image cache of each node in a Kubernetes system, which has been employed as a solution to alleviate the network saturation and scheduling problems noted above, is far from ideal because this results in duplication of images in each cache, which would be wasteful.

SUMMARY

One or more embodiments provide a clustered container host system in which portions of container images are shared opportunistically. According to embodiments, container images are fetched in a clustered container host system with a shared storage device. Hosts of the system include a virtualization software layer that supports execution of virtual machines (VMs) in the hosts, and one or more VMs has implemented therein a container engine that supports execution of containers within the respective VMs. Fetching a first container image in a first virtual machine includes creating a first virtual disk in the shared storage device, storing an image of the first container in the first virtual disk, mounting the first virtual disk to the first virtual machine, and updating a metadata cache to associate the image of the first container to the first virtual disk. Fetching a second container image in a second virtual machine includes checking the metadata cache to determine that a portion of the image of the second container is stored in the first virtual disk, creating a second virtual disk in the shared storage device, adding a reference to the first virtual disk in a metadata of the second virtual disk, and mounting the second virtual disk to the second virtual machine.

Further embodiments include a non-transitory computer-readable storage medium comprising instructions that cause a computer system to carry out the above methods, as well as a computer system configured to carry out the above methods.

DETAILED DESCRIPTION

Figure 1:
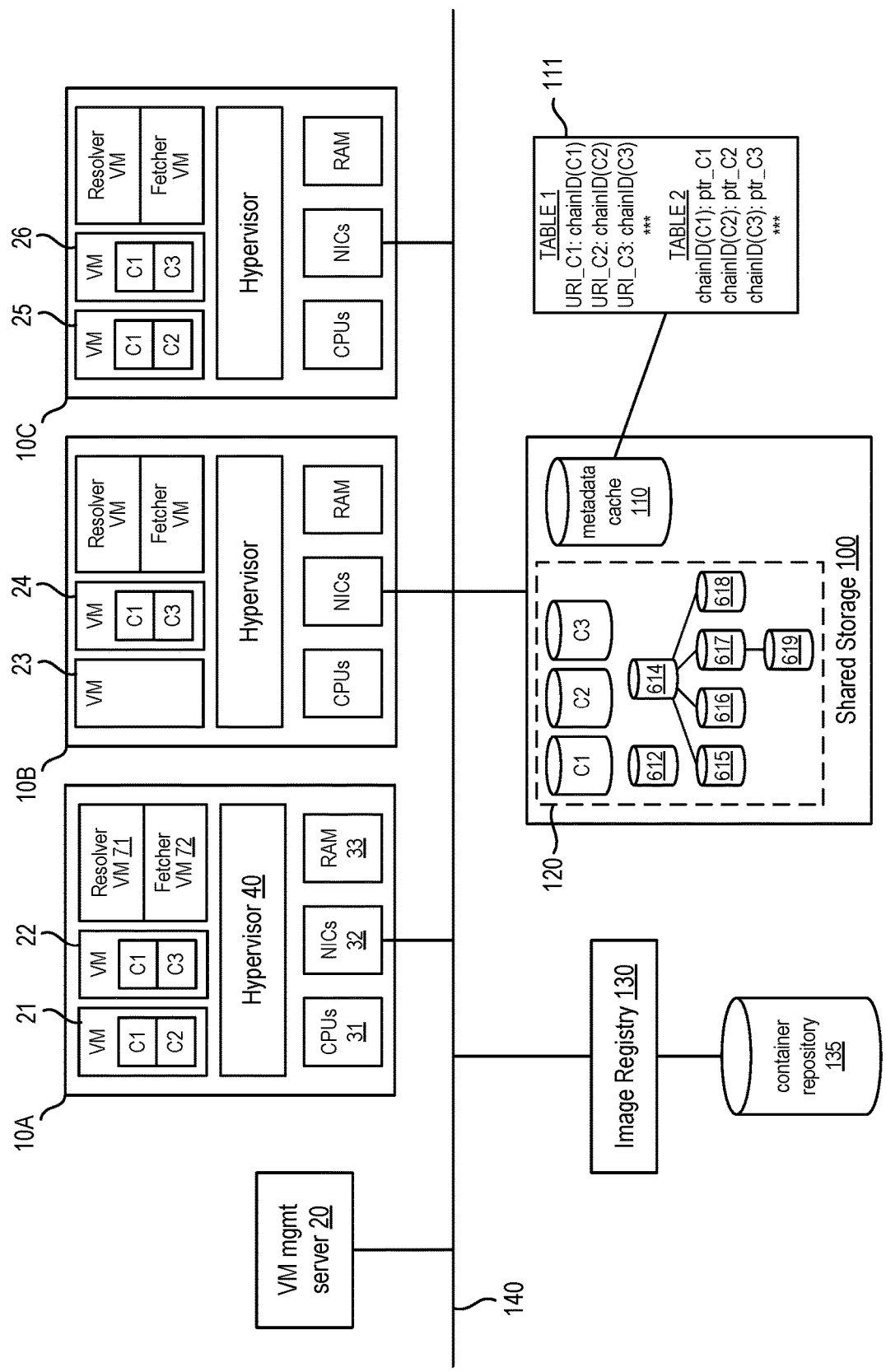
FIG. 1 is a simplified block diagram of a clustered container host system in which embodiments may be implemented.

FIG. 1 is a simplified block diagram of a clustered container host system in which embodiments may be implemented. The system includes a cluster of hosts, hosts 10A, 10B, 10C, which may be constructed on a server grade hardware platform such as an x86 architecture platform. The hardware platform includes one or more central processing units (e.g., CPUs 31 shown in host 10A), one or more network interface controllers (NICs 32 shown in host 10A), and system memory (e.g., random access memory (RAM) 33 shown in host 10A). A virtualization software layer, also referred to herein as a hypervisor (e.g., hypervisor 40 shown in host 10A), is installed on top of the hardware platform. The hypervisor supports a virtual machine execution space within which multiple VMs may be concurrently instantiated and executed. As shown in FIG. 1, the VMs that are concurrently instantiated and executed in host 10A includes VM 21, VM 22, resolver VM 71, and fetcher VM 72. In host 10B, the VMs include VM 23, VM 24, a resolver VM that is configured in the same manner as resolver VM 71, and a fetcher VM that is configured in the same manner as fetcher VM 72. In host 10C, the VMs include VM 25, VM 26, a resolver VM that is configured in the same manner as resolver VM 71, and a fetcher VM that is configured in the same manner as fetcher VM 72. The functions of the resolver VMs and the fetcher VMs will be further described below in conjunction with FIGS. 2 and 3.

In the embodiment illustrated in FIG. 1, a storage system for handling input-output operations (IOs) from hosts 10A, 10B, 10C is provided by shared storage 100 (e.g., a network-attached storage device including magnetic disks and/or flash memory) which is on the same network 140 as hosts 10A, 10B, 10C, and is accessed by hosts 10A, 10B, 10C through their respective NICs. In another embodiment, hosts 10A, 10B, 10C each include a host bus adapter through which IOs are sent to a shared storage (including magnetic disks and/or flash memory) in a storage area network (SAN). In both embodiments, hosts 10A, 10B, 10C may also each include a local storage device (e.g., hard disk drive and/or solid-state drive) for handling IOs. In some embodiments, the local storage devices of the hosts are aggregated and provisioned as a virtual SAN device.

VM management server 20 is a physical or virtual server that cooperates with hypervisors installed in hosts 10A, 10B, 10C to provision VMs from the hardware resources of hosts 10A, 10B, 10C, and virtual disks for the VMs in the shared storage. The unit of managing the hosts by VM management server 20 is a cluster. A cluster may include any number of hosts and in the embodiment illustrated herein the number of hosts in the cluster is three.

A group of containers is executed in VMs in the embodiments to provide isolation from another group of containers running in a different VM. In each VM, a container engine (not shown) runs on top of the VM's guest operating system (not shown) to provide the execution environment for the containers. FIG. 1 shows containers C1, C2 running in VM 21, containers C1, C3 running in VM 22, containers C1, C3 running in VM 24, containers C1, C2 running in VM 25, and containers C1, C3 running in VM 26.

Images of containers C1, C2, C3 are stored as virtual disks in a region of shared storage 100 that has been allocated as global cache 120. In one embodiment, one container image is stored in one virtual disk as read-only and one virtual disk stores only one container image, so there is a one-to-one correspondence between container images and virtual disks that store the container images. In other embodiments, one container image may be stored in one or more read-only virtual disks, so there is a one-to-one correspondence or one-to-many correspondence between container images and virtual disks that store the container images.

Descriptive information about the container images are stored in metadata cache 110, which is searched to determine whether or not an image of a container that is to be spun up in a VM is stored in global cache 120. Metadata cache 110 is also stored in shared storage 100 and is accessible by the VMs of hosts 10A, 10B, 10C through their respective NICs. When an image of the container needs to be loaded into memory of a VM so that the container can be executed in the VM, the container image is retrieved from the corresponding virtual disk in global cache 120 if it is present in global cache 120. If it is not, the container image is fetched from image registry 130, stored as a read-only virtual disk in global cache 120 (for subsequent retrievals of this container image from global cache 120 without going through image registry 130), and loaded into memory of the VM. In some embodiments, the contents of the container images are encrypted prior to being stored in the virtual disks and decrypted when they are loaded into the memory of the VM executing the container. The keys for decrypting the container images may be stored in metadata cache 110.

In the embodiments illustrated herein, metadata cache 110 is a database 111 comprising a plurality of relational database tables. Two such tables are shown in FIG. 1, Table 1 and Table 2. Table 1 has a plurality of entries each corresponding to a container image, which is uniquely identified by its URI (uniform resource identifier). The URI of a container image is composed of the address of an image registry 130 with which the container image is registered, an identifier of container repository 135 in which the container image is stored, a name of the container, and a tag. In one example, different tags are attached to different versions of the container image. In Table 1, the container image's URI is associated with its chain ID, which is depicted as "chainID." The chain ID is a unique ID that represents the contents of the container image and is generated by hashing the contents of the container image.

Figure 5:
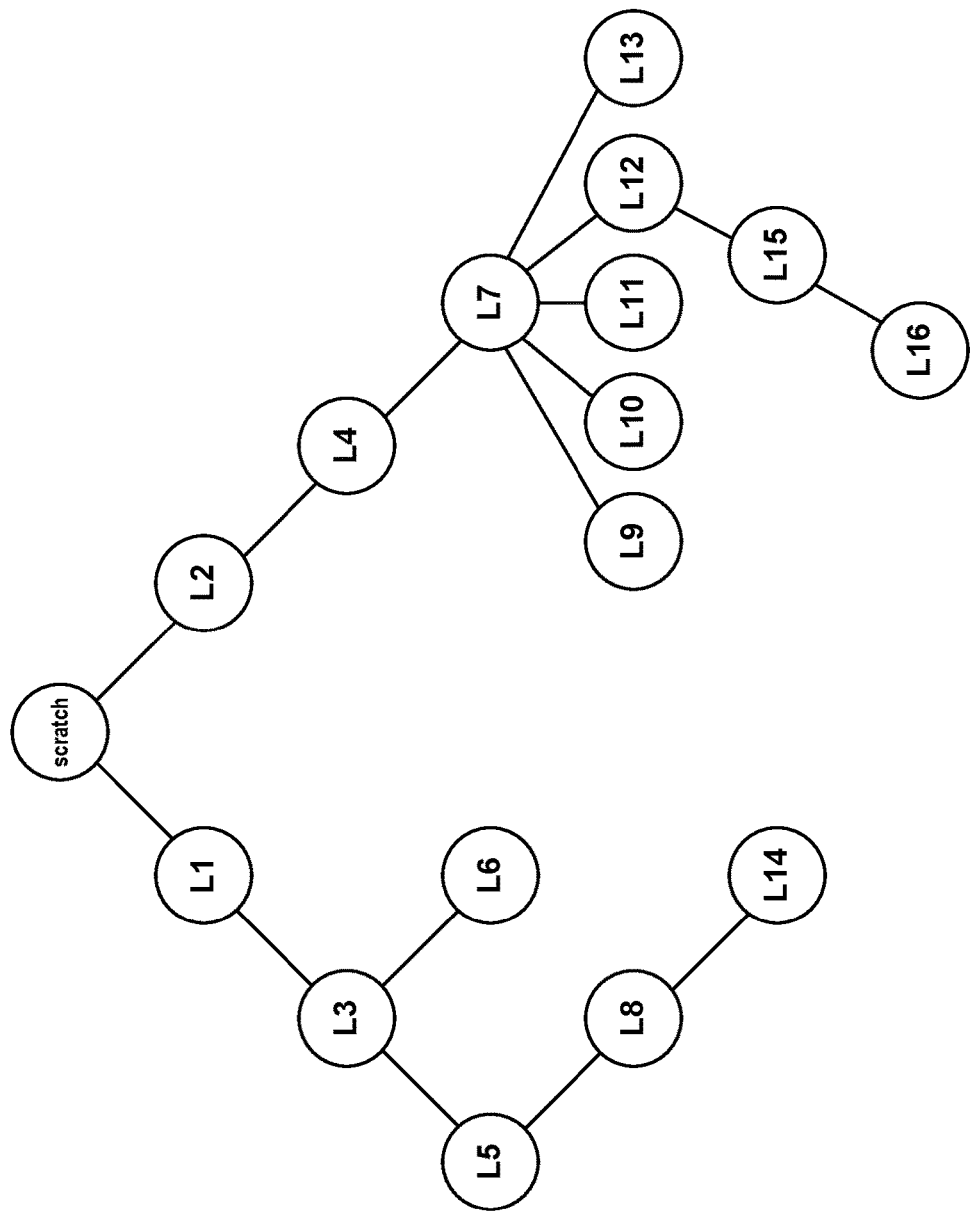
FIG. 5 is a diagram illustrating a hierarchical relationship of layers that make up different container images.

When the container image consists of a plurality of layers, a diff ID is generated for each of the layers by hashing the contents thereof, and the chain ID of the container image is generated as a composite of the diff IDs. The layers that make up the different container images may have a hierarchical relationship and one example of such a hierarchical relationship of the layers is shown in FIG. 5.

When the layers that make up the different container images have a hierarchical relationship and are shared among the container images, opportunities exist for deduping in shared storage 100. To illustrate the opportunistic sharing according to embodiments, it is assumed that the layers have a hierarchical relationship of FIG. 5 and the container images share the layers as follows:

first container image includes layers L2, L4, L7, L9;
second container image includes layers L2, L4, L7, L10;
third container image includes layers L2, L4, L7, L11;
fourth container image includes layers L2, L4, L7, L12;
fifth container image includes layers L2, L4, L7, L13; and
sixth container image includes layers L2, L4, L7, L12, L15, L16.

In this example, the first container image is stored in virtual disk 612, the second container image in virtual disks 614, 615, the third container image in virtual disks 614, 616, the fourth container image in virtual disks 614, 617, the fifth container image in virtual disks 614, 618, and the sixth container image in virtual disks 614, 617, 619. The generation of these virtual disks that have a parent-child relationship with each other is described below in conjunction with FIGS. 6, 7A-7F, 8, and 9.

Table 2 also has a plurality of entries each corresponding to a container image, but Table 2 is indexed by the chain ID of the container image. In Table 2, the chain ID of the container image is associated with a pointer to a virtual disk that stores the container image. It should be recognized that metadata cache 110 is not limited to a database and may take other forms, such as a file based key-value store or a file system based cache that is on some network attached storage device or an in-memory cache, so long as it is centrally accessible.

Container images are registered with image registry 130, which manages a plurality of container repositories (one of which is shown in FIG. 1 as container repository 135) in which images of all containers registered with image registry 130 are stored. Authentication information is associated with each container repository and access to container images in a particular container repository is governed by the authentication information associated therewith. Once a requester is authenticated to a container repository, image registry 130 permits the requester to fetch the container images from that container registry.

Figure 2:
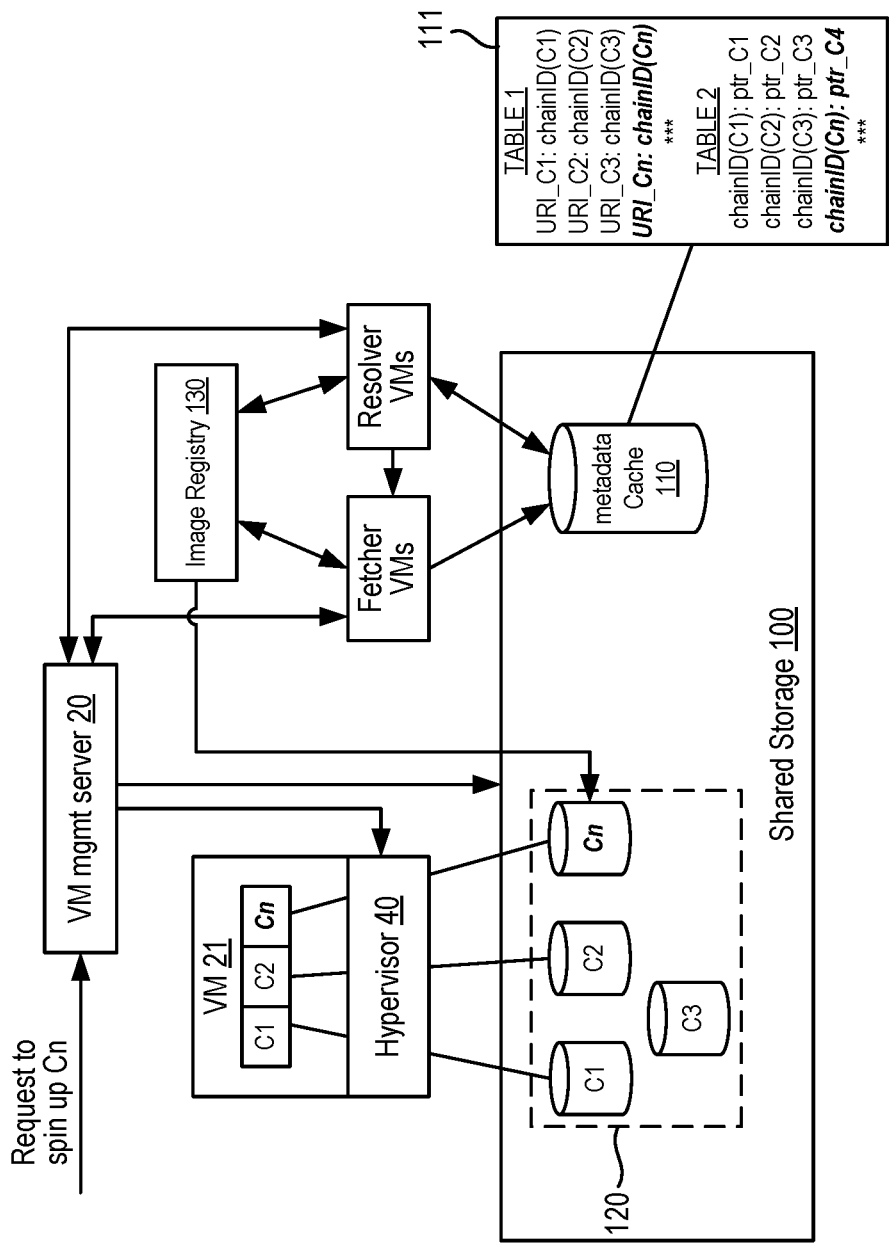
FIG. 2 is a conceptual diagram showing components of the clustered container host system that perform global caching of container images according to embodiments.

FIG. 2 is a conceptual diagram showing components of the clustered container host system that perform global caching of container images according to embodiments. FIG. 2 conceptually illustrates creation of a new virtual disk for image of container Cn in global cache 120. In one embodiment, the new virtual disk for the image of container Cn is created in global cache 120 in response to a request to spin up a new container within a VM, which is received by VM management server 20 from an application administrator, for example.

Upon receiving the request to spin up a new container, VM management server 20 sends a request for an image of the new container to the resolver VMs. The image request includes the URI of the new container image and credentials of the application administrator. The resolver VMs then carry out the function of resolving the image request, which includes: (1) authenticating the credentials with image registry 130, (2) acquiring a chain ID of the new container image from image registry 130 and determining if the new container image corresponding to this chain ID is cached in global cache 120 or not, i.e., whether or not the chain ID is present or not present in metadata cache 110, and (3) acquiring a size of the new container image from image registry 130. If it is not cached, one of the resolver VMs updates metadata cache 110 to add an entry, which associates the URI of the new container image with the chain ID, in Table 1 and to add an entry for the chain ID in Table 2, and also sends a request to fetch the new container image to the fetcher VMs. The request to fetch includes the chain ID of the new container image and the size of the new container image, both of which were acquired from image registry 130.

In the embodiments described herein, the authentication part of the resolving function is carried out when a new container is spun up within a VM. In other embodiments, the authentication part of the resolving function also may be carried out for a container each time that a container is run.

The fetcher VMs carry out the function of fetching in response to the request to fetch the new container image by calling an API of VM management server 20 to create a new virtual disk (also referred to herein as VMDK), the parameters of the API including a size corresponding to the size of the container image acquired from image registry 130. In response to the API calls for creating a new virtual disk, one of the fetcher VMs receives a pointer to the new virtual disk, updates the entry in Table 2 of metadata cache 110 corresponding to the chain ID to add a pointer to the new virtual disk, and sends a fetch request to image registry 130, the fetch request including the chain ID of the new container image. In response, image registry 130 retrieves the contents of the new container image from image repository 135 and transmits the contents of the container image to the fetcher VM. Then, the fetcher VM stores the contents of the container image received from image registry 130 in the new virtual disk.

After creating the new virtual disk, VM management server 20 instructs the hypervisor supporting the VM in which container Cn is to be spun up, to reconfigure the VM to mount the new virtual disk. Once the VM is reconfigured in this manner, container Cn can be executed within VM 21 according to the contents of its container image stored in the new virtual disk.

In some embodiments, the container engine that supports execution of containers in VMs employs an overlay file system. An image of a container executed in such an environment consists of a plurality of layers and these layers need to be mounted on top of each other in the proper order by the overlay file system for execution of the container. Accordingly, when these layers are fetched from image registry 130 and stored in a virtual disk, the fetcher VM, based on information acquired from image registry 130 during the fetching, creates metadata that describes how and in what order the layers should be mounted by the overlay file system, and stores this metadata in global cache 120 for later consumption by the overlay file system during mounting of the layers.

In the embodiments, the function of resolving and the function of fetching are carried out in a distributed manner. As such, all of the resolver VMs in the cluster of hosts managed by VM management server 20 carry out the function of resolving and all of the fetcher VMs in the cluster of hosts managed by VM management server 20 carry out the function of fetching. Although multiple resolver VMs are carrying out the same resolving function, the process described herein ensures that only one resolver VM completes the resolving function. In the case of a cache miss, the resolver VM that is the first to access metadata cache 110 to determine the cache miss will have a lock on Table 2 and will update Table 2 to include the chain ID in response to the cache miss. Consequently, all subsequent accesses to metadata cache 110 to determine a cache hit or miss on the chain ID will result in a cache hit and will not cause a further updating of Table 2. In the case of a cache hit, multiple resolver VMs will call an API of VM management server 20 to mount a virtual disk corresponding to the cache hit, but VM management server 20 will process only the first of these API calls and ignore the rest. Likewise, for fetching, multiple fetcher VMs will call an API of VM management server 20 to create a new virtual disk, but VM management server 20 will process only the first one of the API calls and ignore the rest.

Figure 3:
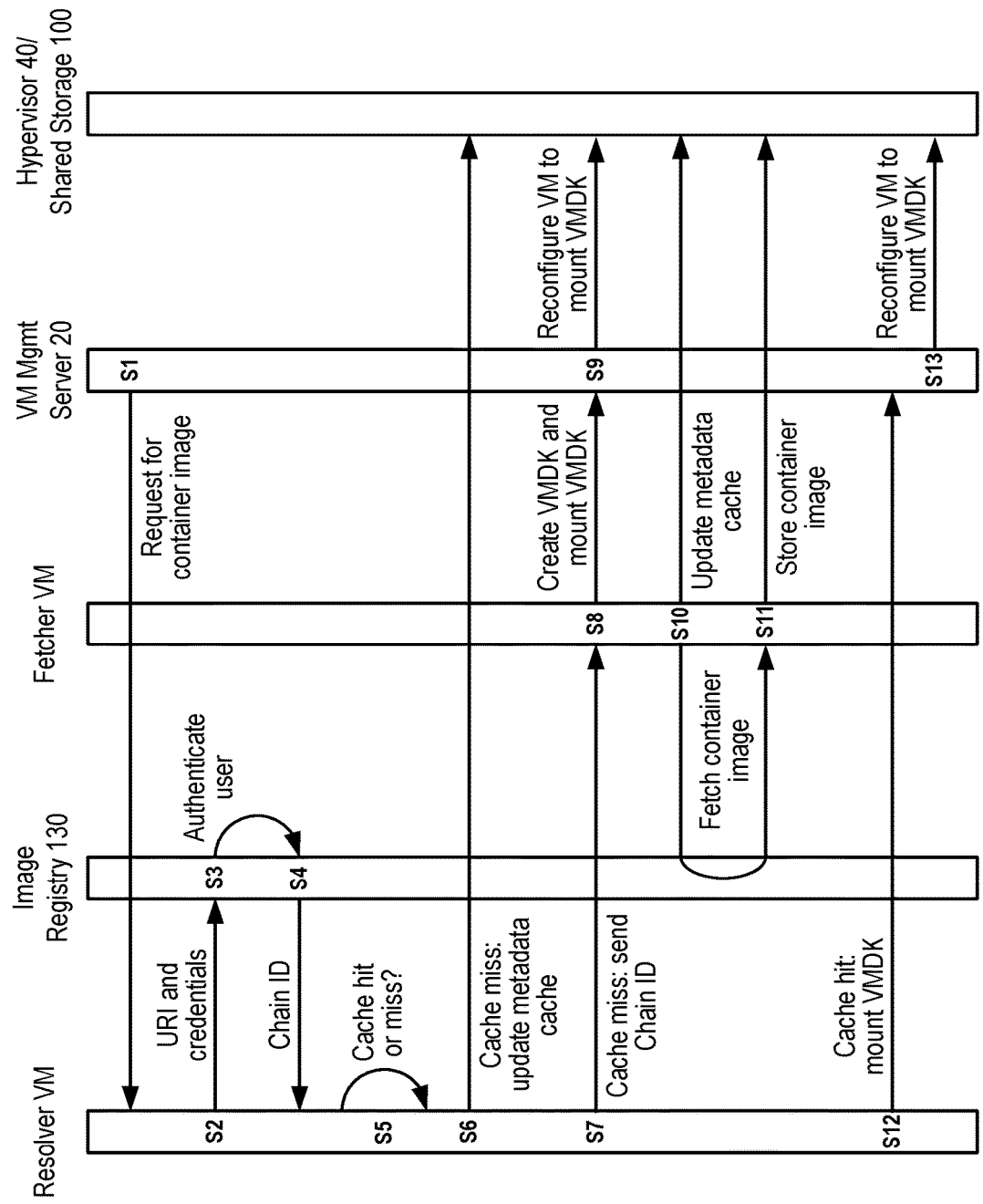
FIG. 3 is a flow diagram illustrating commands and data that are transmitted between the components illustrated in FIG. 2 to enable global caching of container images according to embodiments.

FIG. 3 is a flow diagram illustrating commands and data that are transmitted between the components illustrated in FIG. 2 in response to a request from an application administrator to spin up a new container within a VM.

VM management server 20 at step S1, sends a request for the new container image to the resolver VMs in the cluster of hosts managed by VM management server 20. The image request includes the URI of the new container image and credentials of the application administrator. At step S2, each of the resolver VMs sends the URI and the credentials to image registry 130. If image registry 130 is able to authenticate the credentials at step S3, image registry 130 at step S4 sends the chain ID (which is generated by hashing the contents of the new container image) and a size of the new container image to each resolver VM.

Each resolver VM at step S5 searches metadata cache 110, in particular Table 2, to determine if the chain ID of the new container image acquired from image registry 130 is or is not present in metadata cache 110. If it is not present, a cache miss is determined and steps S6 to S11 are carried out. If it is present, a cache hit is determined and steps S12 and S13 are carried out.

At step S6, the resolver VM (e.g., the first resolver VM that determined the absence of the chain ID in the metadata cache 110) updates metadata cache 110 to add an entry that associates the URI of the new container image with the chain ID to Table 1 and to add an entry for the chain ID in Table 2. At step S7, the resolver VM sends a request to fetch the new container image to the fetcher VMs in the cluster of hosts managed by VM management server 20. The request to fetch includes the chain ID of the new container image and the size of the new container image, both acquired from image registry 130.

Each of the fetcher VMs carries out the function of fetching in response to the request to fetch the new container image. At step S8, the fetcher VMs each call an API of VM management server 20 for creating a new virtual disk of the requested size and thereafter mounting the new virtual disk to the VM in which the new container is to be spun up. VM management server 20 responds to only the first one of these API calls by: (1) sending back a pointer to the new virtual disk to that fetcher VM, and (2) instructing the hypervisor supporting the VM (in which the new container image is to be spun up) to reconfigure the VM to mount the new virtual disk (step S9). After responding to the first one of these API calls, VM management server 20 ignores the remainder of these API calls. Upon receiving the pointer to the new virtual disk, the fetcher VM at step S10 updates the metadata cache 110 using this information and also communicates with image registry 130 to fetch the new container image. Upon fetching the contents of the new container image, the fetcher VM at step S11 downloads the contents of the container image into the new virtual disk. After completion of step S11, the new container is ready to be loaded into the memory of the VM and executed.

At step S12, which is carried out if the chain ID of the new container image acquired from image registry 130 is present in metadata cache 110, each resolver VM determines the pointer to the virtual disk that is associated with the chain ID in Table 2 of metadata cache 110, and calls an API of VM management server 20 for mounting the virtual disk that is located at the determined pointer to the VM in which the new container is to be spun up. VM management server 20 responds to only the first one of these API calls and ignores the rest. Upon receiving the first of these API calls, VM management server 20 at step S13, instructs the hypervisor supporting the VM to reconfigure the VM to mount the virtual disk that is located at the determined pointer. After completion of step S13, the new container is ready to be loaded into the memory of the VM and executed.

Figure 4:
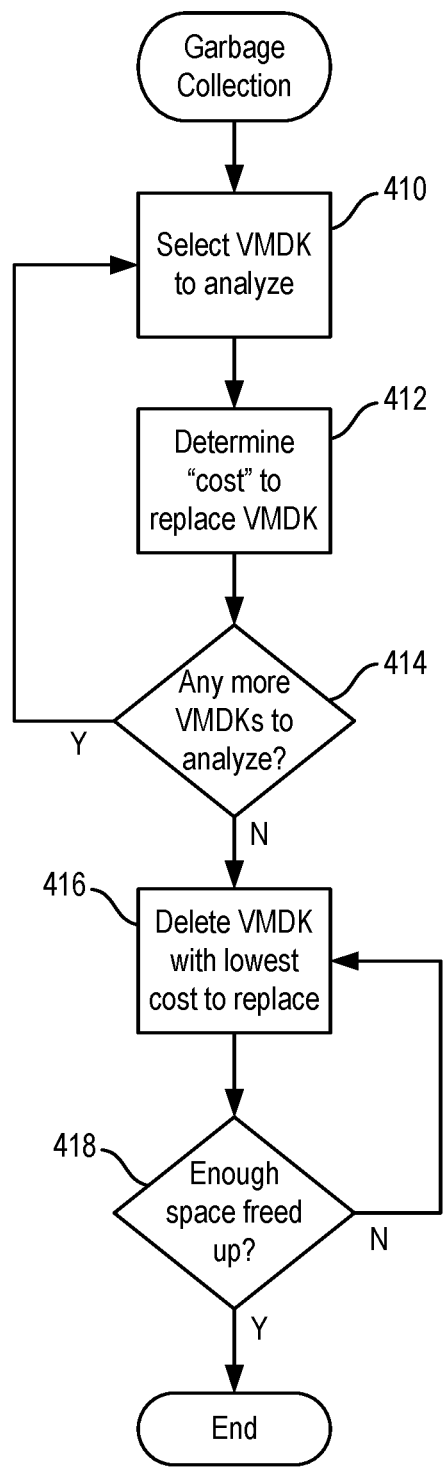
FIG. 4 is a flow diagram illustrating steps of a garbage collection method according to embodiments.

FIG. 4 is a flow diagram illustrating steps of a garbage collection method according to embodiments. The garbage collection method of FIG. 4 is triggered when global cache 120 is running low on available capacity, and is initiated by a dynamic resource scheduler (DRS) of VM management server 20.

The method FIG. 4 begins at step 410, where DRS selects a VMDK in global cache 120 for possible deletion. At step 412, DRS determines the cost of replacing the VMDK, wherein the cost of replacing the VMDK is based on the following factors: (1) likelihood of being used again based on how frequently it has been used in the past (more frequently used images are more costly to replace), (2) its size (bigger images are more costly to replace), and (3) when it was last used (more recently used images are more costly to replace).

The process loops through steps 410 and 412 if it is determined at step 414 that all of the VMDKs stored in global cache 120 have not been analyzed. If they have, step 416 is executed where the VMDK that costs the least to replace is deleted, e.g., by calling an API of VM management server 20 to delete the VMDK. After step 416, it is determined at step 418, whether or not sufficient space has been freed up in global cache 120. If sufficient space has not been freed up, the process returns to step 416, where the VMDK having the next lowest cost to replace is deleted. If sufficient space has been freed up, the process ends.

The embodiments described above provide a global cache, which in comparison to per-node caching employed in conventional implementations, reduces the spin-up time for a container, provides better estimates on how long it will take to spin up a container, and eliminates redundant storing of the same container images.

Figure 6:
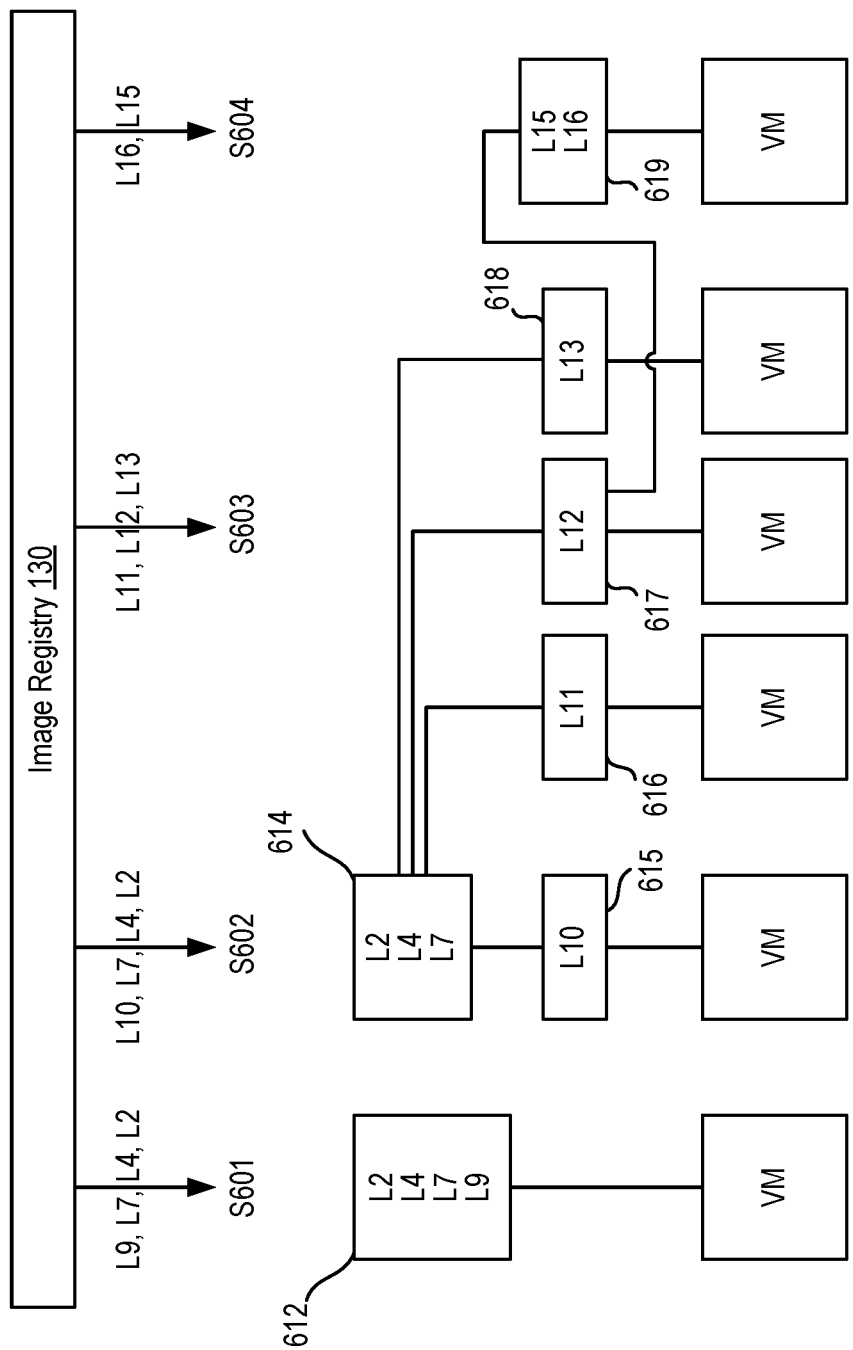
FIG. 6 is a conceptual diagram that illustrates the steps carried out to fetch container images in response to a cache miss, according to embodiments.

The generation of virtual disk 612, and virtual disks 614-619 that have a parent-child relationship with each other and store first, second, third, fourth, fifth, and sixth container images, is now described with reference to FIGS. 5, 6, 7A-7F, 8, and 9. FIG. 6 is a conceptual diagram that illustrates the steps carried out by fetcher VM 72 in response to a cache miss, to pull in or fetch the layers that make up the first, second, third, fourth, fifth, and sixth container images, from image registry 130 so that the container images can be loaded into a VM and executed in the VM. FIGS. 7A-7F depict the different stages of the method carried out in FIG. 6 using the hierarchical depiction of the layers.

Figure 7A:
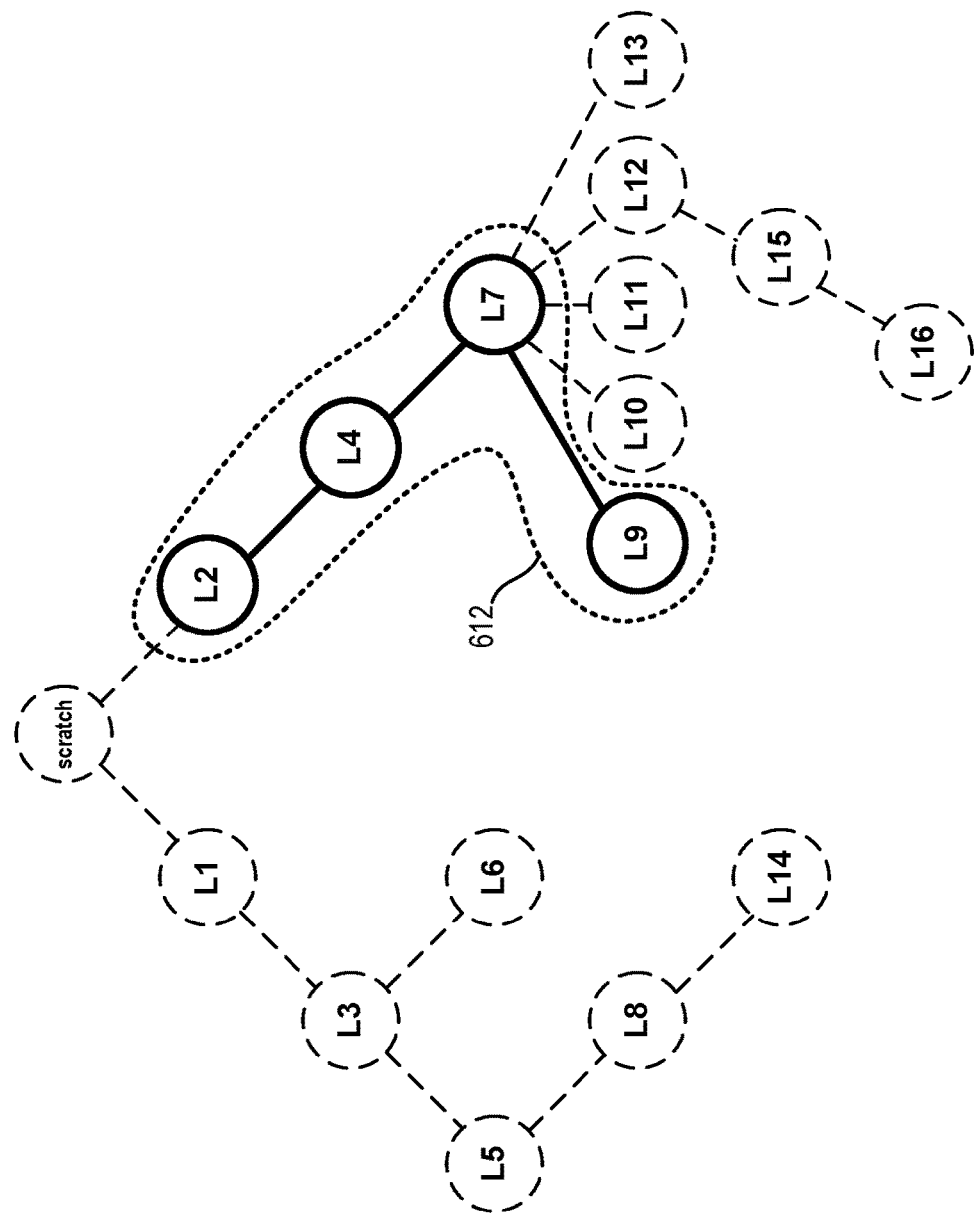
FIGS. 7A-7F depict the different stages of the method carried out in FIG. 6 using the hierarchical depiction of the layers.

In step S601, fetcher VM 72 fetches layers L2, L4, L7, L9 that make up the first container image from image registry 130, makes an API call to VM management server 20 to create virtual disk 612, and stores the fetched layers in virtual disk 612. FIG. 7A illustrates the layers that make up virtual disk 612, which stores the first container image.

Figure 7B:
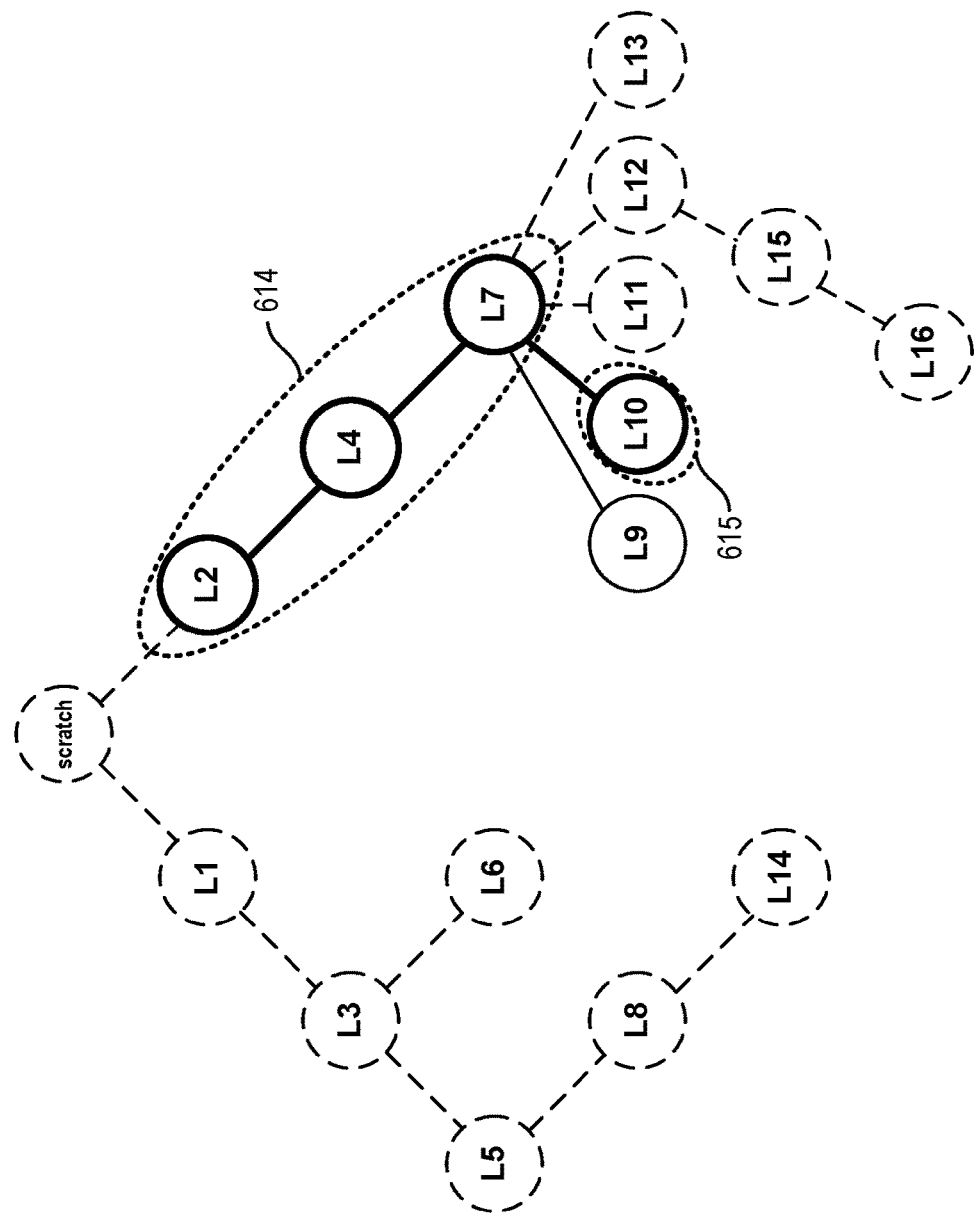

In step S602, fetcher VM 72 fetches layers L2, L4, L7, L10 that make up the second container image from image registry 130. In doing so, fetcher VM 72 recognizes (using the method described below in conjunction with FIG. 9) that layers L2, L4, L7 have been previously fetched. Therefore, fetcher VM 72 makes an API call to VM management server 20 to create two virtual disks, virtual disk 614 to store layers L2, L4, L7 and virtual disk 615 to store layer L10. FIG. 7B illustrates the layers that make up virtual disks 614, 615, which store the second container image.

Figure 7C:
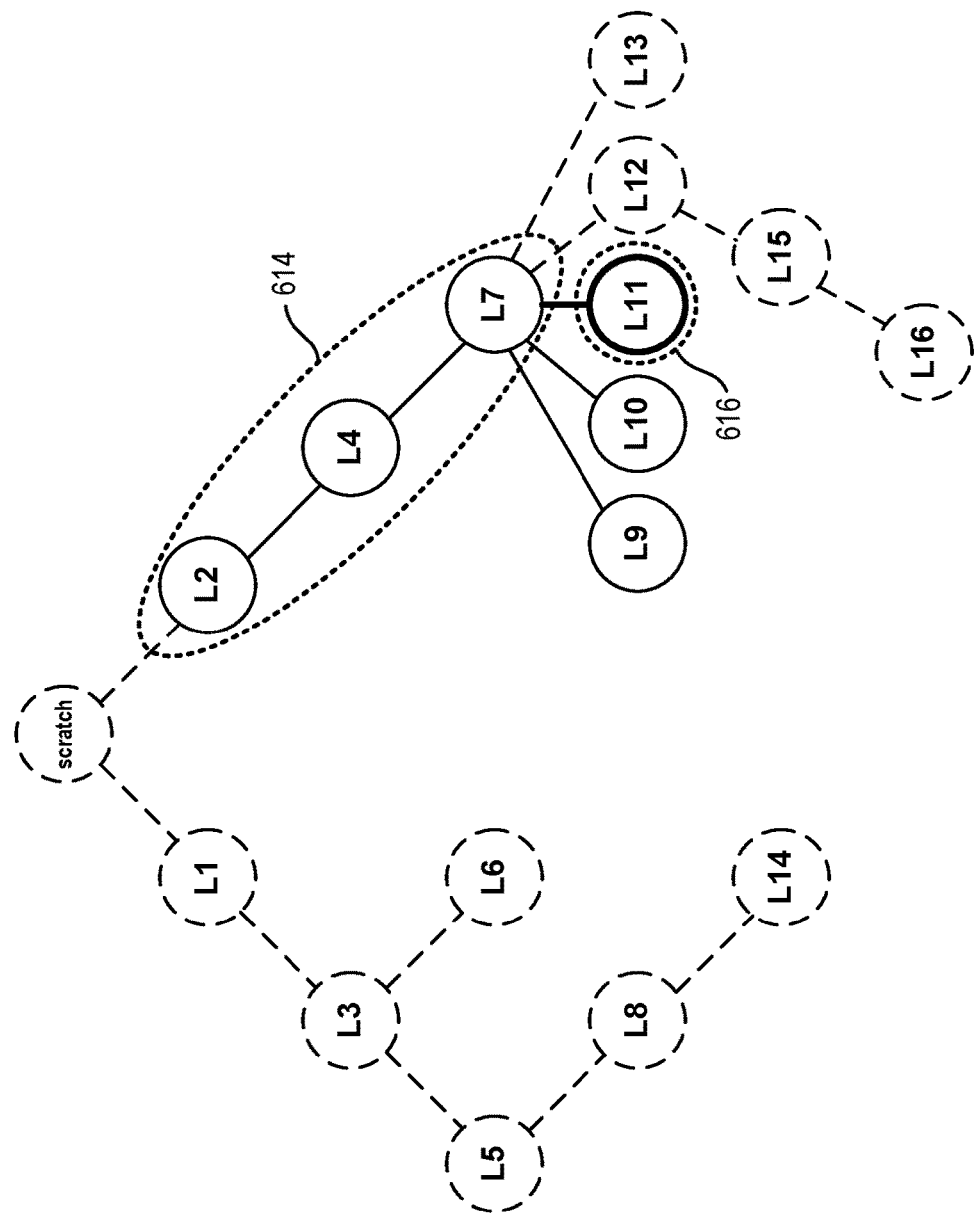
Figure 7D:
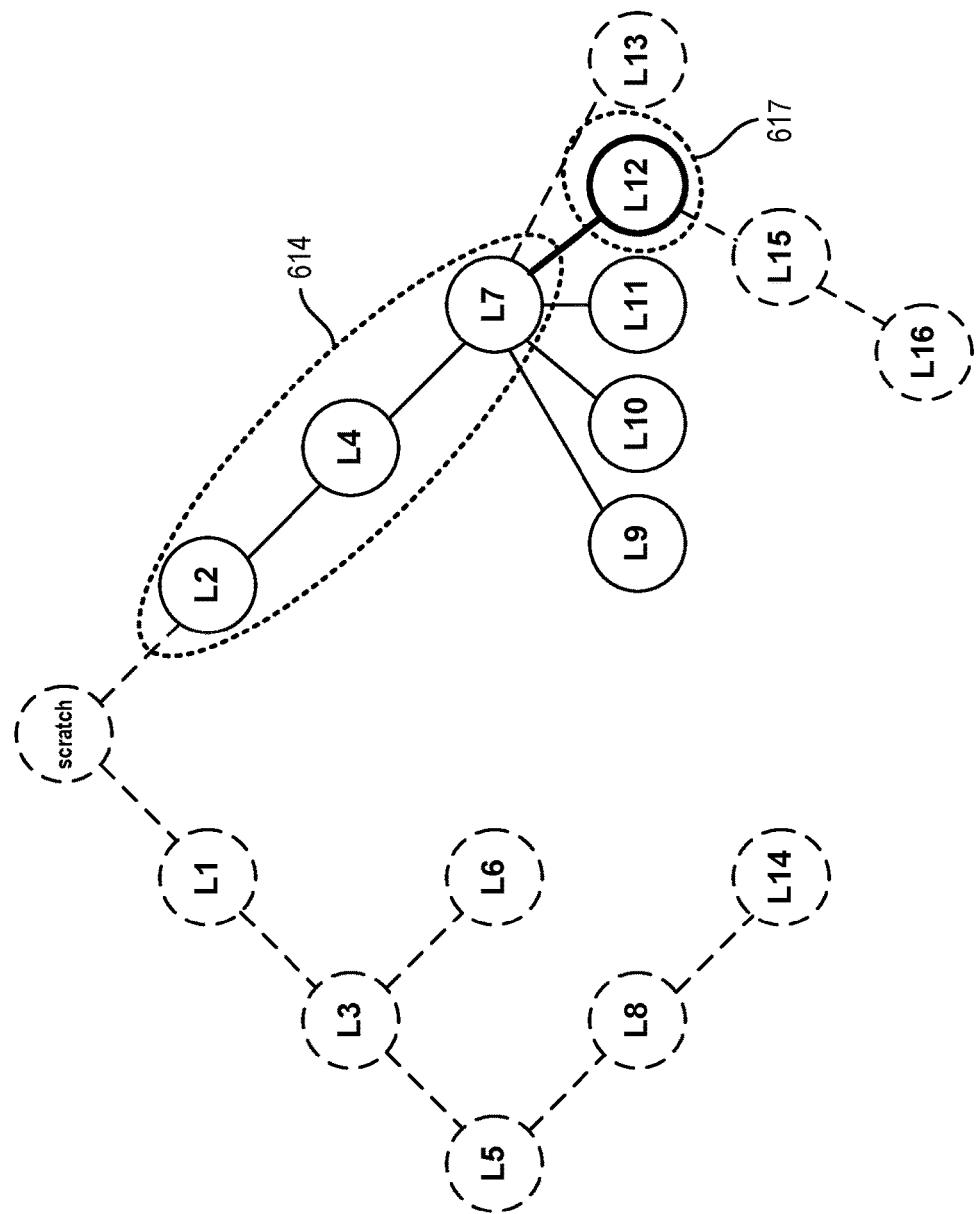
Figure 7E:
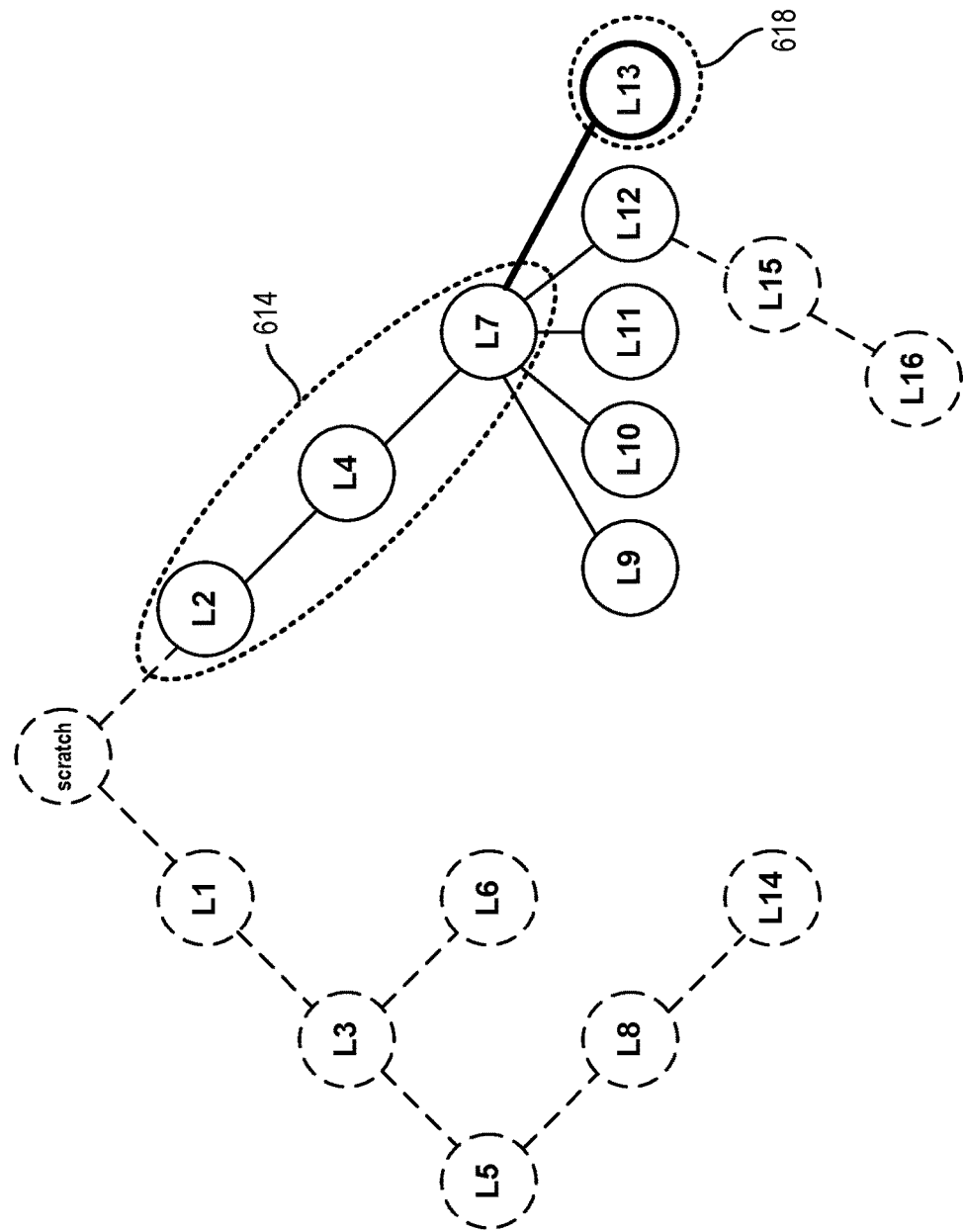

In step S603, before fetcher VM 72 fetches the layers that make up the third, fourth, and fifth container images from image registry 130, fetcher VM 72 recognizes (using the method described below in conjunction with FIG. 8) that layers L2, L4, L7 have been fetched already and stored in virtual disk 614. Therefore, after making an API call to VM management server 20 to create three virtual disks, virtual disks 616, 617, 618, fetcher VM 72 only fetches layers L11, L12, L13 and stores them in virtual disks 616, 617, 618, respectively. FIGS. 7C, 7D, 7E illustrate the layers that make up virtual disks 614, 616, 617, 618, which store the third, fourth, and fifth container images.

Figure 7F:
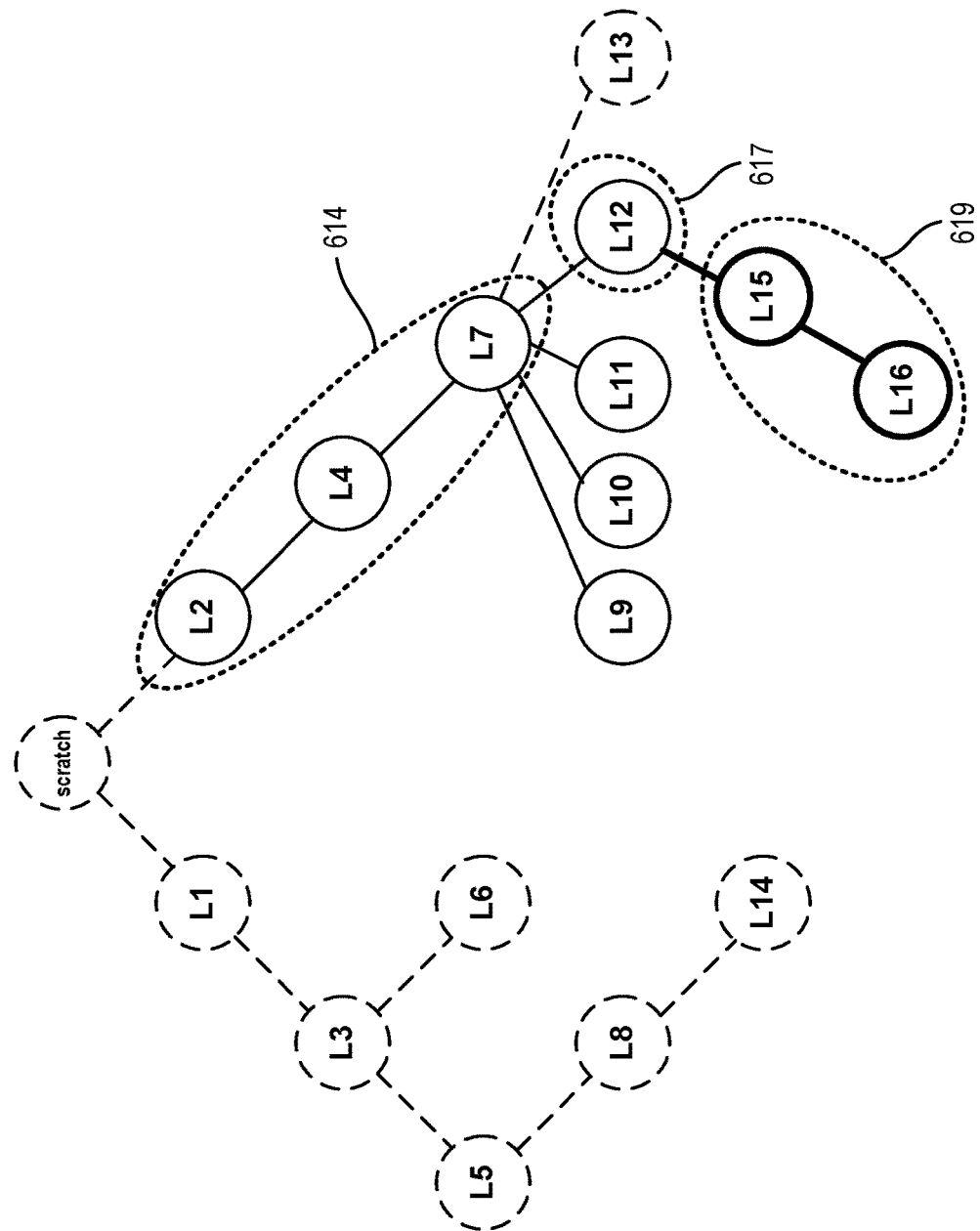

In step S604, before fetcher VM 72 fetches the layers that make up the sixth container image from image registry 130, fetcher VM 72 recognizes (using the method described below in conjunction with FIG. 8) that layers L2, L4, L7 have been fetched already and stored in virtual disk 614 and layer L12 has been fetched already and stored in virtual disk 617. Therefore, after making an API call to VM management server 20 to create virtual disk 619, fetcher VM 72 only fetches layers L15, L16 and stores them in virtual disk 619. FIG. 7F illustrates the layers that make up virtual disks 614, 617, 619, which store the sixth container image.

In one embodiment, the virtual disks are indexed in metadata cache 110 by chain IDs, and the indexed virtual disk stores a full container image comprising all of the layers required for that container image. Thus, each chain ID for a virtual disk is the composite of all diff IDs of the layers required for the container image.

In further embodiments, each chain ID for a virtual disk is the composite of diff IDs of all layers stored in the virtual disk and diff IDs of all of its parent layers, which are not stored in the virtual disk. For example, the chain ID for virtual disk 612 is the composite of diff IDs of layers L2, L4, L7, L9, and the chain ID for virtual disk 617 is the composite of diff IDs of layers L2, L4, L7, L12. In order to determine whether or not parent layers of a container image are already stored in a virtual disk, resolver VM 71 acquires from image registry 130 diff IDs of all layers for the container image.

Figure 8:
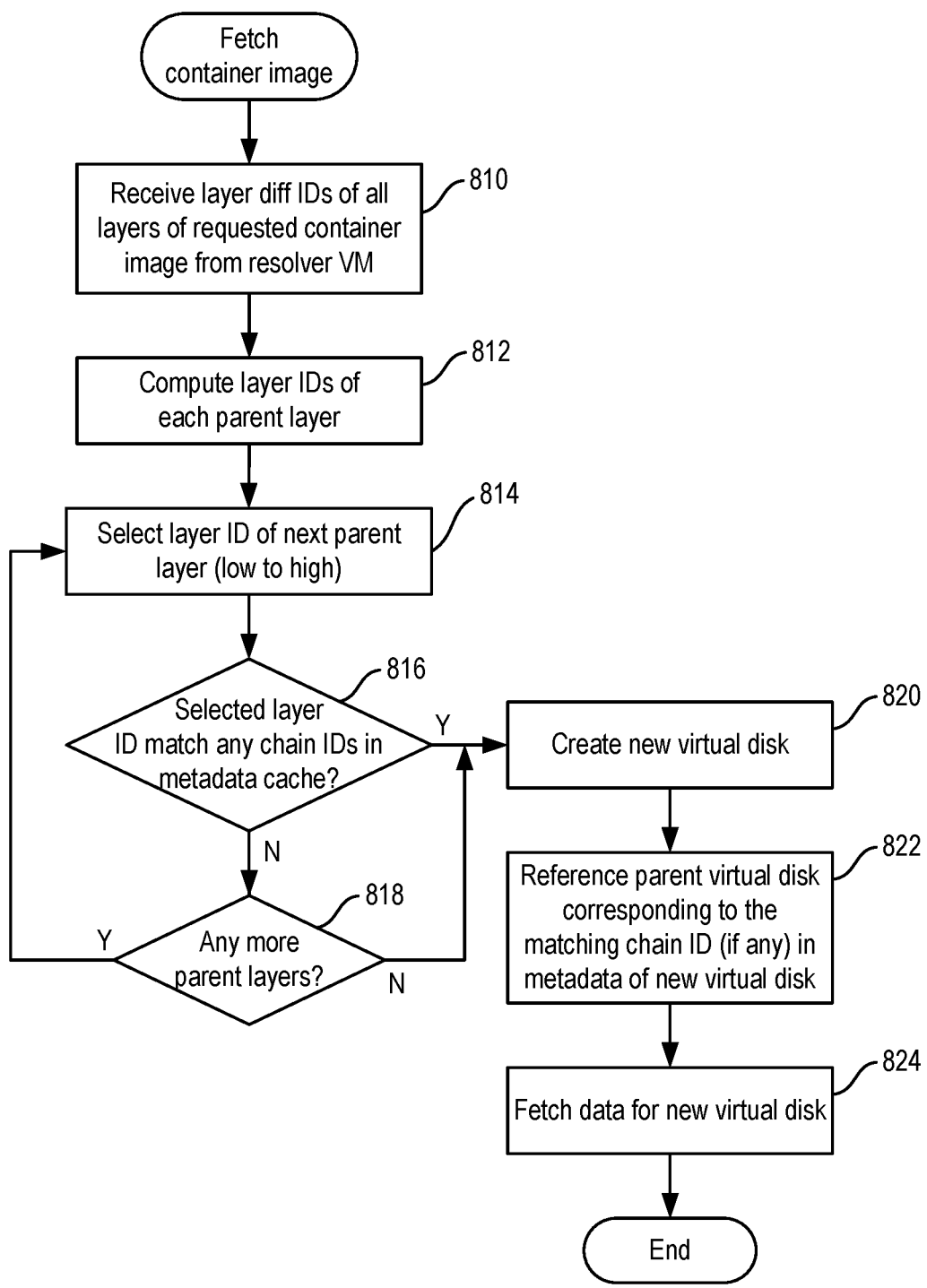
FIG. 8 is a flow diagram that illustrates steps carried out to determine if an image of any of the parent layers of a requested container image matches an image already stored in one or more virtual disks.

FIG. 8 is a flow diagram that illustrates steps carried out by a fetcher VM to determine if an image of any of the parent layers of a requested container image matches an image already stored in one or more virtual disks.

The method of FIG. 8 begins at step 810, where the fetcher VM receives from the resolver VM, diff IDs of all layers of a container image the fetcher VM has been requested to fetch. Then, at step 812, the fetcher VM computes chain IDs of each of its parent layers. For example, if the sixth container image is being requested, the chain IDs of each of L2, L4, L7, L12, L15 layers are computed in the following manner:

chain ID of L2=diff ID of L2
chain ID of L4=chain ID of L2+diff ID of L4
chain ID of L7=chain ID of L4+diff ID of L7
chain ID of L12=chain ID of L7+diff ID of L12
chain ID of L15=chain ID of L12+diff ID of L15

After computing the chain IDs of each parent layer, the chain IDs of the parent layers are selected one by one at step 814 going from lowest level in the hierarchy to the highest level in the hierarchy. Thus, for the sixth container image, the chain ID of layer L15 will be selected first and the chain ID of layer L2 will be selected last. If the selected chain ID matches a chain ID stored in metadata cache 110 (step 816, Yes), this means that the parent layer(s) represented by the selected chain ID are already stored in virtual disk(s). Thus, the fetcher VM creates a new virtual disk (step 820) and adds a pointer to the parent virtual disk corresponding to the matching chain ID in the metadata of the new virtual disk (step 822). Then, at step 824, the fetcher VM fetches the contents of the remaining layers of the container image and stores them in the new virtual disk. If the selected chain ID does not match a chain ID stored in metadata cache 110 (step 816, No), step 818 is executed to determine if any more parent layers are present. If there is, step 814 is executed to select the next parent layer. If not, step 820 is executed to create a new virtual disk and step 822 is skipped because there is no parent virtual disk corresponding to the matching chain ID.

Figure 9:
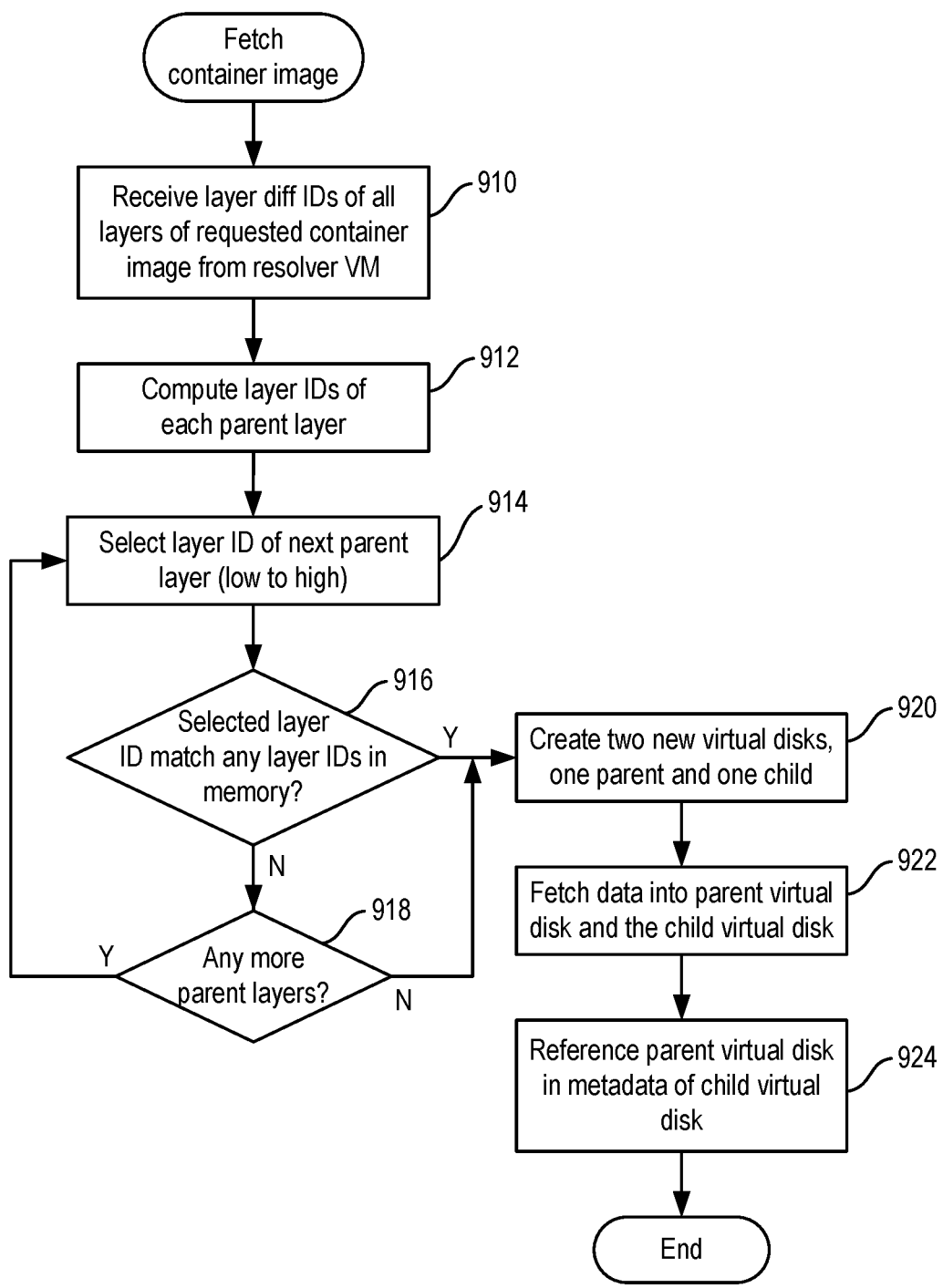
FIG. 9 is a flow diagram that illustrates steps carried out to determine future sharing opportunities when some of parent layers of a requested container image are already stored in one or more virtual disks.

FIG. 9 is a flow diagram that illustrates steps carried out by a fetcher VM to determine future sharing opportunities when some of parent layers of a requested container image are already stored in one or more virtual disks. In order to carry out the method of FIG. 9, chain IDs of all parent layers of previously requested container images are maintained in an in-memory map.

The method of FIG. 9 begins at step 910, where the fetcher VM receives from the resolver VM, diff IDs of all layers of a container image the fetcher VM has been requested to fetch. Then, at step 912, the fetcher VM computes chain IDs of each of its parent layers. For example, if the second container image is being requested after the first container image has been fetched, the chain IDs of each of L2, L4, L7, L10 layers are computed in the following manner:

chain ID of L2=diff ID of L2
chain ID of L4=chain ID of L2+diff ID of L4
chain ID of L7=chain ID of L4+diff ID of L7
chain ID of L10=chain ID of L7+diff ID of L10

After computing the chain IDs of each parent layer, the chain IDs of the parent layers are selected one by one at step 914 going from lowest level in the hierarchy to the highest level in the hierarchy. Thus, for the second container image, the chain ID of layer L7 will be selected first and the chain ID of layer L2 will be selected last. If the selected chain ID matches a chain ID maintained in the in-memory map (step 916, Yes), this means that the parent layer(s) represented by the selected chain ID have been previously fetched and stored in virtual disk(s) and are good candidates for being fetched again. Thus, the fetcher VM at step 920 creates two new virtual disks, one parent and one child, and at step 922 fetches the data into the parent virtual disk and the child virtual disk. Then, at step 924, the fetcher VM references the parent virtual disk in the metadata of the child virtual disk.

The benefit of the algorithms described above is that disk chains are created where layer sharing is demonstrated. Worst case scenario is that layers are duplicated twice. Over time the global cache should trend towards optimal sharing as fat virtual disks are broken up and replaced.

The embodiments described above may be implemented in a Kubernetes system. In such a Kubernetes system, VMs 21, 22, 24, 25, 26 are Kubernetes pods, and hosts 10A, 10B, 10C are nodes of the Kubernetes system.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims.

Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

What is claimed is:

1. A method of fetching container images in a clustered container host system comprising a plurality of hosts that share a storage device, wherein the hosts each include a virtualization software layer that supports execution of virtual machines in the hosts, and one or more virtual machines has implemented therein a container engine that supports execution of containers within the respective virtual machines, said method comprising:
   in connection with deploying a first container in a first virtual machine, storing first and second portions of an image of the first container in first and second virtual disks, respectively, adding a reference to the first virtual disk in a metadata of the second virtual disk, and updating a metadata cache to associate the first and second portions of the image of the first container to the first and second virtual disks, respectively; and
   in connection with deploying a second container in a second virtual machine, checking the metadata cache to determine that a first portion of the image of the second container is stored in the first virtual disk, creating a new virtual disk, adding a reference to the first virtual disk in a metadata of the new virtual disk, and storing a second portion of the image of the second container in the new virtual disk.

2. The method of claim 1, wherein the image of the second container comprises a plurality of layers arranged top to bottom in a hierarchy and the first portion of the image of the second container that is stored in the first virtual disk includes one or more uppermost layers in the hierarchy.

3. The method of claim 1, wherein the first and second virtual machines are running in different hosts.

4. The method of claim 1, wherein the first and second virtual machines are running in the same host.

5. The method of claim 1, wherein the first and second virtual machines are pods of a Kubernetes system and the hosts are nodes of a Kubernetes cluster.

6. A non-transitory computer readable medium comprising instructions to be executed in a computing device to cause the computing device to carry out a method of fetching container images in a clustered container host system with a shared storage device, wherein hosts each include a virtualization software layer that supports execution of virtual machines in the hosts, and one or more virtual machines has implemented therein a container engine that supports execution of containers within the respective virtual machines, said method comprising:
   in connection with deploying a first container in a first virtual machine, storing first and second portions of an image of the first container in first and second virtual disks respectively, adding a reference to the first virtual disk in a metadata of the second virtual disk, and updating a metadata cache to associate the first and second portions of the image of the first container to the first and second virtual disks, respectively; and
   in connection with deploying a second container in a second virtual machine, checking the metadata cache to determine that a first portion of the image of the second container is stored in the first virtual disk, creating a new virtual disk, adding a reference to the first virtual disk in a metadata of the new virtual disk, and storing a second portion of the image of the second container in the new virtual disk.

7. The non-transitory computer readable medium of claim 6, wherein the image of the second container comprises a plurality of layers arranged top to bottom in a hierarchy and the first portion of the image of the second container that is stored in the first virtual disk includes one or more uppermost layers in the hierarchy.

8. The non-transitory computer readable medium of claim 6, wherein the first and second virtual machines are running in different hosts.

9. The non-transitory computer readable medium of claim 6, wherein the first and second virtual machines are running in the same host.

10. The non-transitory computer readable medium of claim 6, wherein the first and second virtual machines are pods of a Kubernetes system and the hosts are nodes of a Kubernetes cluster.

11. A clustered container host system comprising:
   a storage device; and
   a plurality of hosts that share the storage device, wherein the hosts each include a virtualization software layer that supports execution of virtual machines (VMs) therein, and one or more VMs have implemented therein a container engine that supports execution of containers within the respective VMs, wherein the hosts are configured to:
   in connection with deploying a first container in a first VM, store first and second portions of an image of the first container in first and second virtual disks, respectively, add a reference to the first virtual disk in a metadata of the second virtual disk, and update a metadata cache to associate the first and second portions of the image of the first container to the first and second virtual disks, respectively; and
   in connection with deploying a second container in a second VM, check the metadata cache to determine that a first portion of the image of the second container is stored in the first virtual disk, create a new virtual disk, add a reference to the first virtual disk in a metadata of the new virtual disk, and store a second portion of the image of the second container in the new virtual disk.

12. The clustered container host system of claim 11, wherein the plurality of hosts is managed as a Kubernetes cluster and as a VM host cluster by a virtual machine management server that manages all VMs in the hosts and provisions the virtual disks for the VMs in the storage device.

13. The method of claim 11, wherein the image of the second container comprises a plurality of layers arranged top to bottom in a hierarchy and the first portion of the image of the second container that is stored in the first virtual disk includes one or more uppermost layers in the hierarchy.

14. The method of claim 11, wherein the first and second VMs are running in different hosts.

15. The method of claim 11, wherein the first and second VMs are running in the same host.

* * * * *